(12) United States Patent
Miyoshi et al.

(10) Patent No.: US 11,837,740 B2
(45) Date of Patent: Dec. 5, 2023

(54) POWER STORAGE DEVICE

(71) Applicant: HONDA MOTOR CO., LTD., Tokyo (JP)

(72) Inventors: Kyosuke Miyoshi, Saitama (JP); Shoshi Hidaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 381 days.

(21) Appl. No.: 17/123,136

(22) Filed: Dec. 16, 2020

(65) Prior Publication Data

US 2021/0194085 A1 Jun. 24, 2021

(30) Foreign Application Priority Data

Dec. 23, 2019 (JP) .................................. 2019-231624

(51) Int. Cl.

| H01M 50/209 | (2021.01) |
|---|---|
| H01M 50/244 | (2021.01) |
| H01M 50/249 | (2021.01) |
| H01M 10/04 | (2006.01) |
| H01M 10/0525 | (2010.01) |

(52) U.S. Cl.
CPC ..... *H01M 50/209* (2021.01); *H01M 10/0481* (2013.01); *H01M 10/0525* (2013.01); *H01M 50/244* (2021.01); *H01M 50/249* (2021.01); *H01M 2220/20* (2013.01)

(58) Field of Classification Search
CPC .................................................... H01M 50/209
See application file for complete search history.

(56) References Cited

U.S. PATENT DOCUMENTS

2015/0171492 A1  6/2015 Ramsayer et al.

FOREIGN PATENT DOCUMENTS

| CN | 206931628 U | | 1/2018 |
|---|---|---|---|
| JP | 2012022937 | * | 2/2012 |
| JP | 2012022937 A | | 2/2012 |
| JP | 2015520924 A | | 7/2015 |

OTHER PUBLICATIONS

Office Action issued in the CN Patent Application No. 202011510446.0, dated Jun. 6, 2023.

* cited by examiner

*Primary Examiner* — Lisa S Park

(74) *Attorney, Agent, or Firm* — CKC & Partners Co., LLC

(57) ABSTRACT

A power storage device comprises: a cell group in which a plurality of battery cells each having a terminal on a first surface are stacked; a cylindrical housing part that houses the cell group; a first plate member extending from the first surface of each of the battery cells in the cell group to side surfaces of each of the battery cells, the side surfaces being adjacent to the first surface, the first plate member being housed in the housing part together with the cell group; a cell side protrusion portion protruding from a portion extending on each of the side surfaces of each of the battery cells toward an inner wall surface of the housing part in the first plate member; and an insertion member that is press-fitted to contact both of the cell side protrusion portion and the inner wall surface disposed closer to the first surface side than the cell side protrusion portion, and presses the cell group against an opposite side of a side facing the first surface via the cell side protrusion portion.

10 Claims, 9 Drawing Sheets

POWER STORAGE DEVICE

This application is based on and claims the benefit of priority from Japanese Patent Application 2019-231624, filed on 23 Dec. 2019, the content of which is incorporated herein by reference.

BACKGROUND OF THE INVENTION

Field of the Invention

The present invention relates to a power storage device.

Related Art

Since hybrid vehicles or electric vehicles require a larger amount of power than typical gasoline vehicles, a power storage device in which a plurality of battery cells such as lithium ion secondary batteries are stacked is mounted in the hybrid vehicles or electric vehicles. The plurality of battery cells need to be held in the power storage device to be prevented from vibrating due to vibration of a vehicle or the like.

There has been conventionally known a battery device in which a pin-shaped fastening protrusion is provided on a bottom surface of a cell casing of an individual battery cell, and the individual battery cell mounted on a cooling plate is fastened to the cooling plate using the fastening protrusion passing through the cooling plate (see Patent Document 1).
Patent Document 1: Japanese Unexamined Patent Application (Translation of PCT Application), Publication No. 2015-520924

SUMMARY OF THE INVENTION

However, in the above-described conventional technique, the battery cells need to be individually fastened to the cooling plate to hold the battery cells, resulting in poor assembly workability of the battery device.

The present invention has an object to provide a power storage device in which a plurality of battery cells can be easily held, resulting in good assembly workability.

(1) A power storage device according to the present invention (for example, a power storage device 1 described later) comprises: a cell group (for example, a cell group 3 described later) in which a plurality of battery cells (for example, battery cells 31 described later) each having a terminal (for example, a terminal 32 described later) on a first surface (for example, an upper surface 31*a* described later) are stacked; a cylindrical housing part (for example, a housing part 2 described later) that houses the cell group; a first plate member (for example, an upper plate member 5 described later) extending from the first surface of each of the battery cells in the cell group to side surfaces (for example, side surfaces 31*c* described later) of each of the battery cells, the side surfaces being adjacent to the first surface, the first plate member being housed in the housing part together with the cell group; a cell side protrusion portion (for example, a cell side protrusion portion 54 described later) protruding from a portion extending on each of the side surfaces of each of the battery cells toward an inner wall surface (for example, an inner surface 23*a*, 24*a* described later) of the housing part in the first plate member; and an insertion member (for example, an insertion member 8 described later) that is press-fitted to contact both of the cell side protrusion portion and the inner wall surface disposed closer to the first surface side than the cell side protrusion portion, and presses the cell group against an opposite side of a side facing the first surface via the cell side protrusion portion.

According to the above-described (1), since the cell group can be pressed and held in the housing part just by press-fitting the insertion member between the cell side protrusion portion of the first plate member housed in the housing part together with the cell group and the inner wall surface of the housing part, there can be provided the power storage device in which the plurality of battery cells can be easily held, resulting in good assembly workability.

(2) In the power storage device according to (1), an elastic member (for example, an elastic member 64 described later) that receives a load from the cell group pressed by the insertion member may be provided between the cell group and the inner wall surface of the housing part.

According to the above-described (2), the cell group can be stably held when the elastic member is compressed. In addition, since a vibration applied to the cell group can be absorbed by the elastic member, noise and impacts caused by such vibration can be prevented from occurring.

(3) In the power storage device according to (2), the elastic member may be disposed in a corner portion at a diagonal position of the insertion member via the cell group.

According to the above-described (3), vibrations in an up-down direction and a left-right direction of the cell group can be absorbed by the elastic member.

(4) The power storage device according to (2) or (3) comprises a second plate member (for example, a lower plate member 6 described later) disposed to cover a second surface (for example, a bottom surface 31*d* described later) side of each of the battery cells disposed at an opposite side of the first surface in the cell group, the second plate member being housed in the housing part together with the cell group, wherein the elastic member may be provided in the second plate member.

According to the above-described (4), the elastic member can be easily disposed in the housing part by the second plate member.

(5) In the power storage device according to (4), the second plate member includes a pair of side frame portions (for example, side frame portions 61 described later) extending at both ends along a length direction of a lower surface of the cell group, the elastic member is held between upper claw portions (for example, upper claw portions 61*a* described later) and lower claw portions (for example, lower claw portions 61*b* described later) that are alternately disposed on an upper side and a lower side of each of the pair of side frame portions along the length direction, and the upper claw portions each may include a contact portion (for example, a contact portion 61*c* described later) that contacts the side surface of the battery cell.

According to the above-described (5), since the upper claw portions are deformed toward the side surfaces of the battery cell and the side surfaces of the battery cell are sandwiched from both sides by the contact portions, the lower portion of the battery cell is firmly held.

(6) In the power storage device according to any one of (1) to (5), the cell side protrusion portion may be disposed in the first plate member on each of both side surface sides of the battery cell.

According to the above-described (6), the cell group in the housing part can be more stably held.

(7) in the power storage device according to any one of (1) to (6), a contact recess portion (for example, a contact recess portion 27 described later) having an inner surface (for example, an inner surface 27*a* described later) sandwiching the insertion member between the contact recess portion and the cell side protrusion portion may be provided in the inner wall surface of the housing part disposed closer to the first surface side than the cell side protrusion portion.

According to the above-described (7), the insertion member is smoothly guided in an insertion direction by the contact recess portion. Since the insertion member press-fitted to be fitted into the contact recess portion is held in the contact recess portion, a pressing force can be stably applied to the cell side protrusion portion. In addition, since it is simply required that the insertion member is made small to an extent capable of being fitted into the contact recess portion, the power storage device can be reduced in size and weight.

(8) In the power storage device according to (7), an inner wall side protrusion portion (for example, an inner wall side protrusion portion 28 described later) protruding toward the cell group side is provided in the inner wall surface of the housing part facing the cell side protrusion portion, and the inner wall side protrusion portion is disposed on an opposite side of the cell side protrusion portion via the insertion member, and at least a part of the inner wall side protrusion portion overlaps with the cell side protrusion portion as viewed from a side facing the first surface.

According to the above-described (8), since a movement of the cell group in a direction in which the cell side protrusion portion and the inner wall side protrusion portion approach each other is restricted by contact between the cell side protrusion portion and the inner wall side protrusion portion, the terminal of the battery cell can be protected.

The present invention can provide a power storage device in which a plurality of battery cells can be easily held, resulting in good assembly workability.

DETAILED DESCRIPTION OF THE INVENTION

Figure 1:
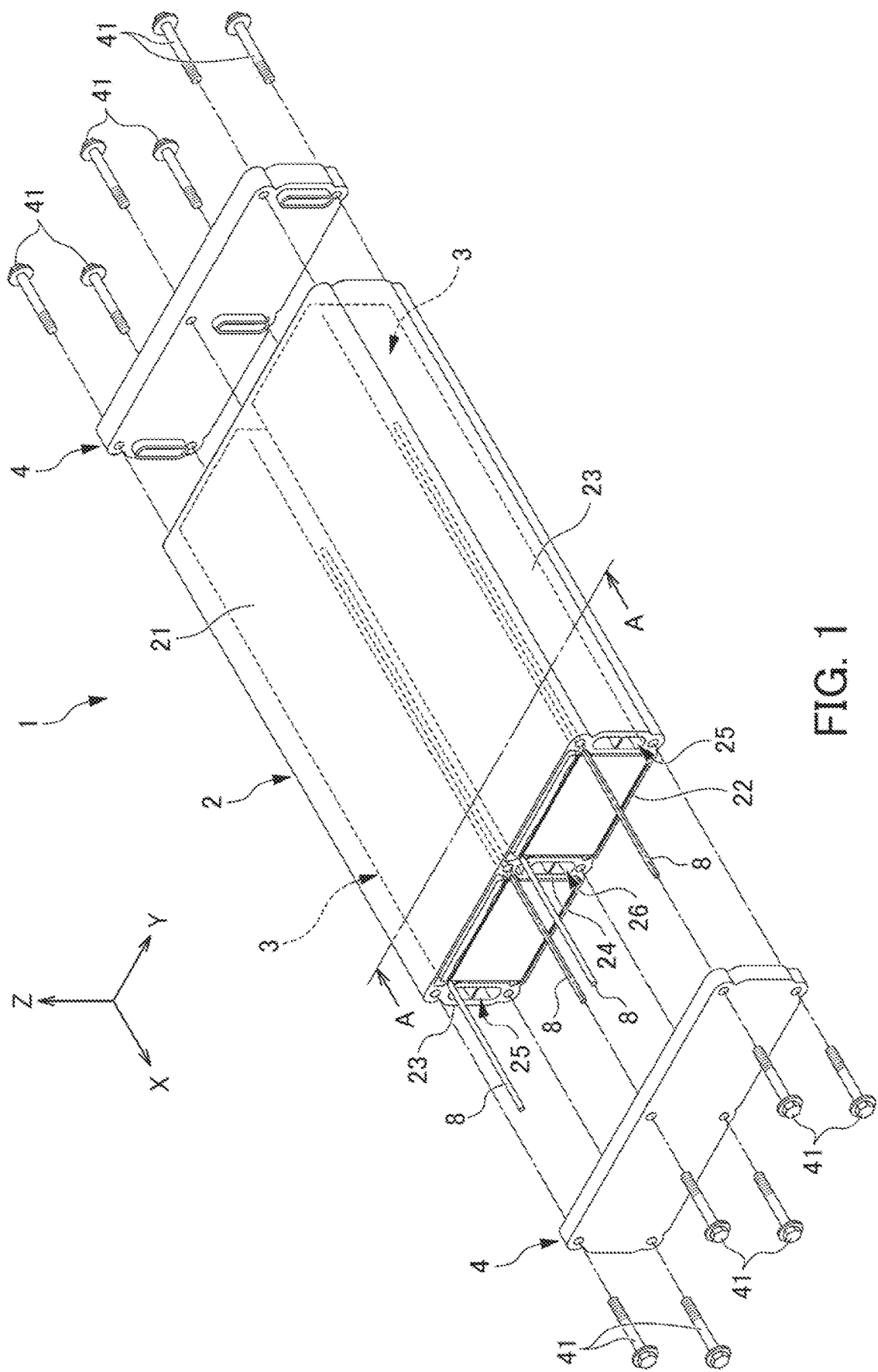
FIG. 1 is an exploded perspective view illustrating a power storage device according to one embodiment.
Figure 2:
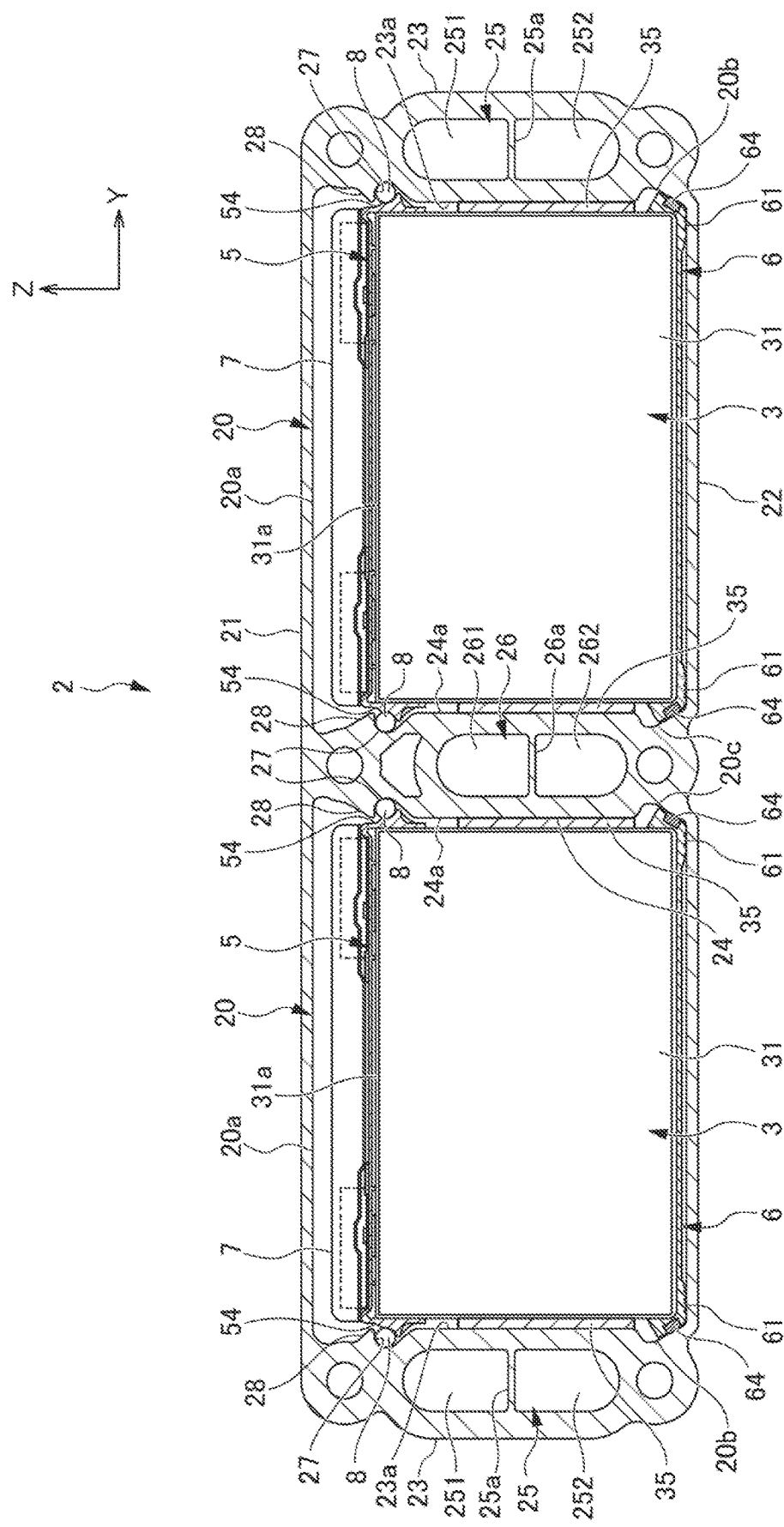
FIG. 2 is a cross-sectional view along line A-A in FIG. 1.
Figure 3:
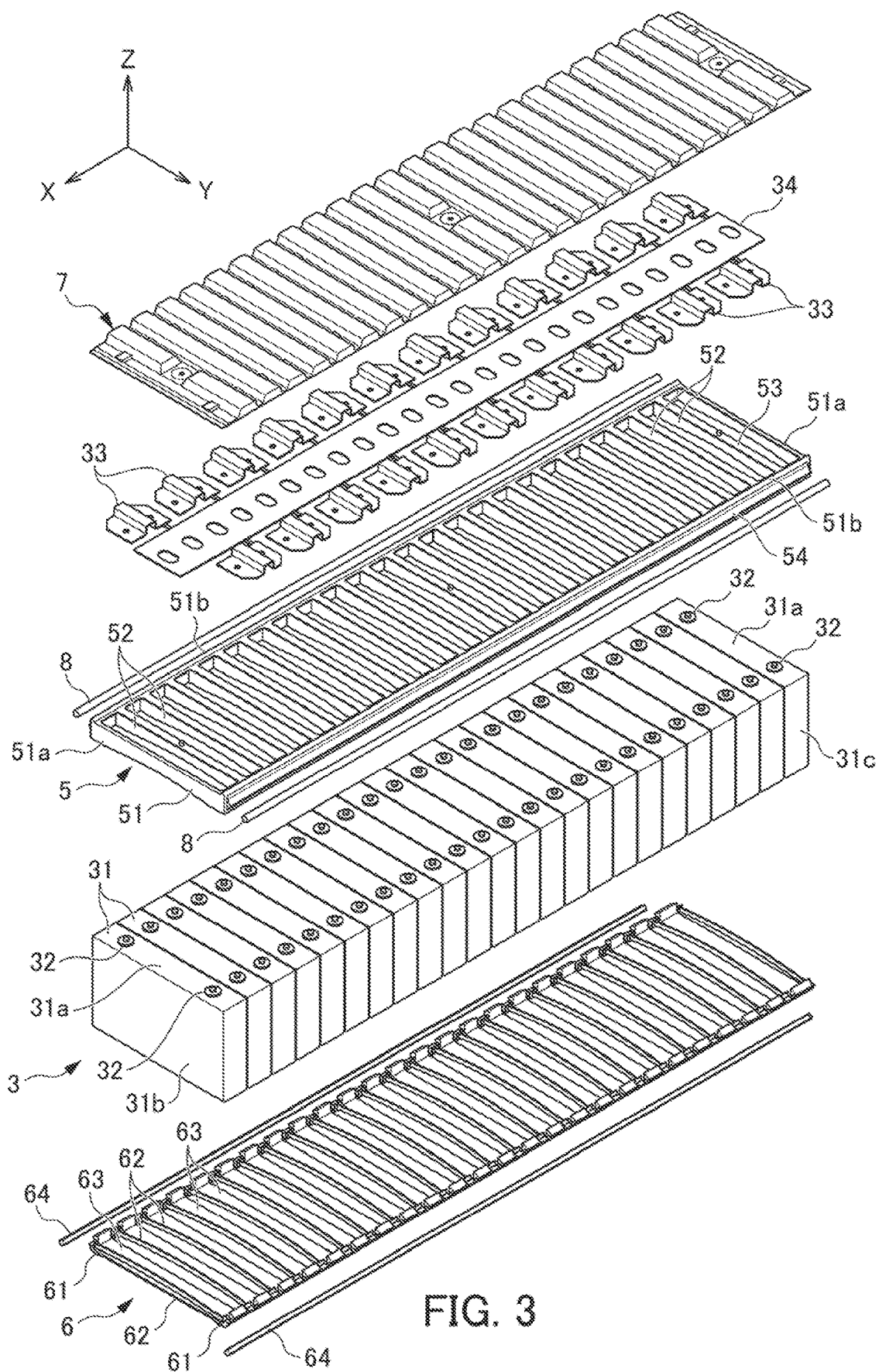
FIG. 3 is an exploded perspective view illustrating components in a housing part in the power storage device.

Hereinafter, embodiments of the present invention will be described with reference to the drawings. FIG. 1 is an exploded perspective view illustrating a power storage device according to one embodiment. FIG. 2 is a cross-sectional view along line A-A in FIG. 1. FIG. 3 is an exploded perspective view illustrating components in a housing part in the power storage device. As illustrated in FIG. 1, a power storage device 1 includes a housing part 2, cell groups 3, 3 to be housed in the housing part 2, and end plates 4, 4. Note that in directions indicated by arrows in each drawing, a direction along an X direction indicates a length direction of the power storage device 1 and the housing part 2. A direction along a Y direction indicates a width direction of the power storage device 1 and the housing part 2. A direction along a Z direction indicates a height direction of the power storage device 1 and the housing part 2.

The housing part 2 illustrated in the present embodiment is a case made of metal such as aluminum or an aluminum alloy, and is formed in a horizontally long quadrangular cylindrical shape in which a dimension in the width direction (Y direction) is larger than that in the height direction (Z direction). The housing part 2 is an extrusion-molded product formed by extrusion molding along one direction (X direction). Since the housing part 2 constituted by the extrusion-molded product can be easily formed and does not have a joint portion in which plate members are joined to each other, assembly variation or thermal distortion arising from the joint portion does not occur. Hence, the housing part 2 has a stable shape.

The housing part 2 includes an upper wall portion 21 and a lower wall portion 22 facing each other in the height direction, two side wall portions 23, 23 facing each other in the width direction, and one middle wall portion 24 disposed between the side wall portions 23, 23 and extending in parallel with the side wall portions 23, 23 from the upper wall portion 21 to the lower wall portion 22. In the housing part 2, two rows of housing spaces 20, 20 each tor housing the cell group 3 are formed as spaces surrounded by the upper wall portion 21, the lower wall portion 22, the side wall portions 23, 23, and the middle wall portion 24. Openings 20a, 20a formed in a horizontally long rectangular shape are open in both ends of the housing part 2 in the length direction (X direction), respectively, so that the housing spaces 20, 20 communicate with the outside.

Heat exchange medium flow paths 25, 26 through which heat exchange media to be subjected to heat exchange with the battery cells 31 (described later) forming the cell groups 3, 3 flow are provided inside the side wall portions 23, 23 and inside the middle wall portion 24 of the housing part 2, respectively. The heat exchange medium flow paths 25, 26 extend along the entire length of the housing part 2 in the length direction, and each is opened to both ends of the housing part 2 in the length direction. As illustrated in FIG. 2, the heat exchange medium flow paths 25, 26 are divided into the upper flow paths 252, 261 and the lower flow paths 252, 262 by flow path partition walls 25a, 26a extending along the length direction of the housing part 2 at a substantially center portion of the housing part 2 in the height direction, respectively. The upper flow path 251 and the lower flow path 252 are aligned with the upper flow path 261 and the lower flow path 262 in the height direction of the housing part 2, respectively.

As illustrated in FIG. 3, each of the cell groups 3,3 housed in the respective housing spaces 20, 20 of the housing part 2 is configured by stacking along the X direction a plurality of battery cells 31 formed in a rectangular parallelepiped shape, for example, lithium ion secondary batteries. The battery cell 31 is configured by housing an electrode body (not illustrated) in a cell case made of aluminum, an aluminum alloy or the like, and has a pair of positive and negative terminals 32, 32 on an upper surface 31a (first surface) disposed to face in the Z direction. The terminals 32, 32 of the battery cells 31, 31 adjacent to each other in the stacking direction are electrically connected by a bus bar 33. Accordingly, all the battery cells 31 configuring one cell group 3 are electrically connected in series or in parallel. Each of the bus bars 33 is electrically connected to a common flexible printed circuit board 34 extending in the stacking direction (X direction) of the battery cells 31 on the upper surface 31a side of the battery cells 31. The flexible printed circuit board 34 serves as a voltage detection line to be connected to a voltage sensor (not illustrated) for detecting a voltage of each of the battery cells 31.

Figure 4:
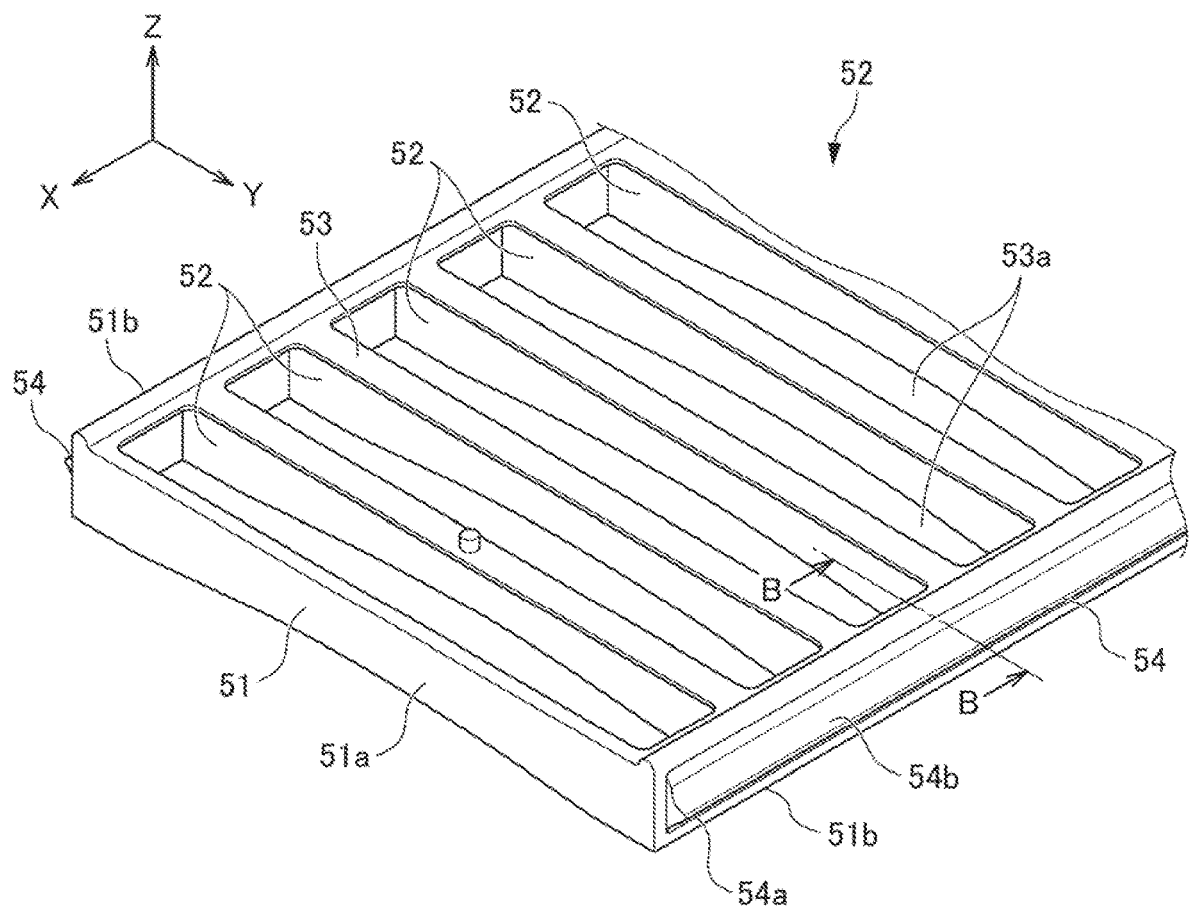
FIG. 4 is a perspective view illustrating a portion of an upper plate member when viewed obliquely from above.
Figure 5:
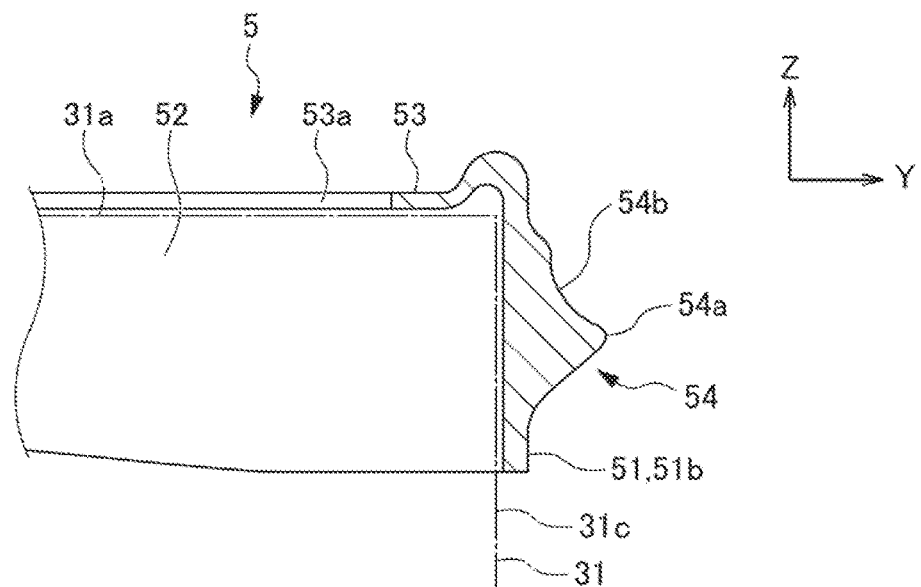
FIG. 5 is a cross-sectional view along line B-B in FIG. 4.
Figure 6:
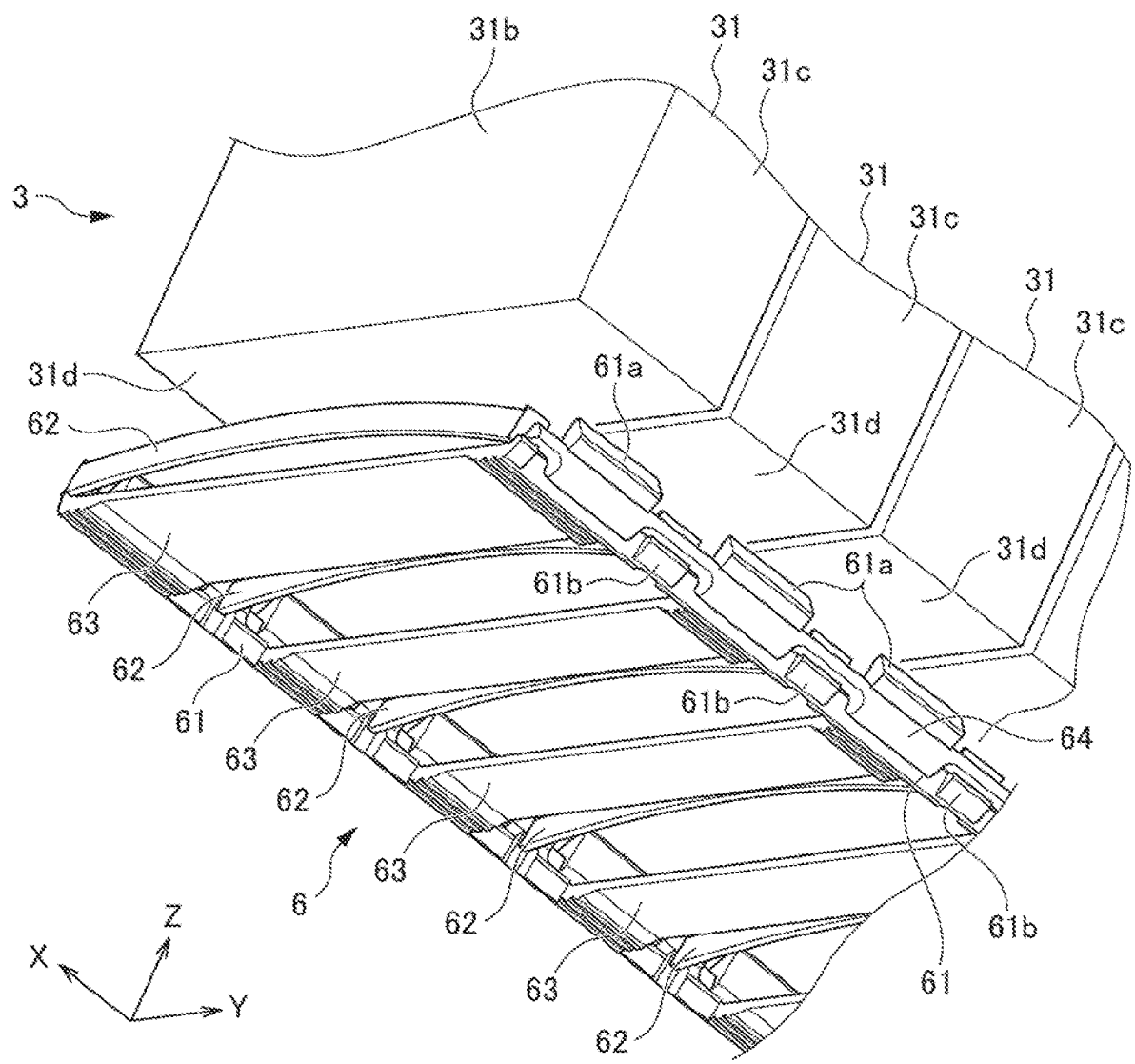
FIG. 6 is a perspective view illustrating a portion of a lower plate member when viewed obliquely from below.
Figure 7:
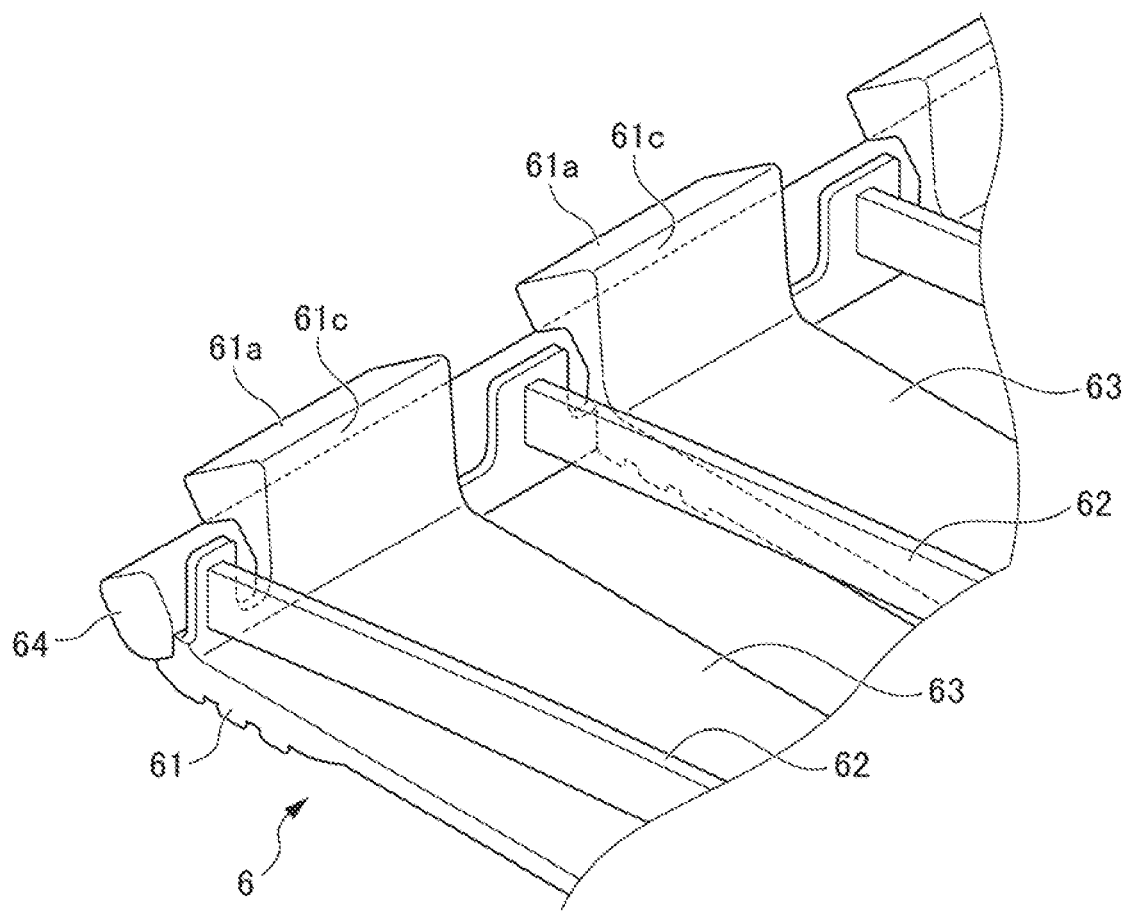
FIG. 7 is an enlarged perspective view illustrating a portion of the lower plate member.

An upper plate member 5 (first plate member) is disposed above the cell group 3, and a lower plate member 6 (second plate member) is disposed below the cell group 3. The upper plate member 5 and the lower plate member 6 will be further described with reference to FIG. 4 to FIG. 7. FIG. 4 is a perspective view illustrating a portion of the upper plate member when viewed obliquely from above. FIG. 5 is a cross-sectional view along line B-B in FIG. 4. FIG. 6 is a perspective view illustrating a portion of the lower plate member when viewed obliquely from below. FIG. 7 is an enlarged perspective view illustrating a portion of the lower plate member.

The upper plate member 5 is formed of, for example, an insulating resin such as polypropylene or polyethylene. The upper plate member 5 integrally includes a rectangular frame portion 51 dimensioned to surround an upper surface of the cell group 3 (a surface including the upper surfaces 31a of the plurality of stacked battery cells 31), a plurality of upper partition plate portions 52 that partition the inside of the rectangular frame portion 51 along the width direction (Y direction) of the cell group 3, and an upper plate portion 53 forming an upper surface of the upper plate member 5.

The rectangular frame portion 51 is formed by assembling a pair of end frames 51a, 51a disposed at both ends of the cell, group 3 in the length direction (X direction), and a pair of side frames 51b, 51b extending along the length direction of the cell group 3 to form a rectangular shape. The end frames 51a, 51a are disposed on end surfaces 31b, 31b facing in the stacking direction of the two battery cells 31, 31 disposed at the outermost ends of the cell group 3, to extend at a predetermined height (a height along the Z direction). The side frames 51b, 51b are disposed on side surfaces 31c, 31c which are both end surfaces of all the battery cells 31 in the cell group 3 in the width direction, to extend at a substantially same height as the end frames 51a, 51a.

The upper partition plate portions 52 are provided between the pair of side frames 51b, 51b, to be in parallel with the end frames 51a, 51a. The upper partition plate portions 52 are disposed so that the surface direction thereof is in parallel with the height direction (Z direction) of the cell group 3. The height of the upper partition plate portions 52 along the Z direction is substantially the same as that of the rectangular frame portion 51. The upper partition plate portions 52 are disposed at a predetermined interval in parallel with one another, to correspond to respective portions between the battery cells 31, 31 adjacent to each other.

The upper plate portion 53 is provided over an upper end of the rectangular frame portion 51 and upper ends of the upper partition plate portions 52, thereby being disposed to extend in parallel with the upper surfaces 31a of the respective battery cells 31. The upper plate portion 53 has rectangular openings 53a formed between each of the end frames 51a, 51a and the adjacent upper partition plate portion 52 and between the upper partition plate portions 52, 52 adjacent to each other. Each of the openings 53a is provided between the upper partition plate portions 52, 52 adjacent to each other so that the upper surface 31a including the two terminals 32, 32 of one battery cell 31 is exposed upward. The area of one opening 53a is slightly smaller than that of the upper surface 31a of one battery cell 31. Therefore, the upper plate portion 53 extends along outer peripheral portions of the respective upper surfaces 31a of the battery cells 31, in the peripheries of the openings 53a.

Cell side protrusion portions 54, 54 protruding in the width direction (the width direction of the cell group 3) of the upper plate member 5 are provided on the pair of side frames 51b, 51b of the rectangular frame portion 51, respectively. The cell side protrusion portions 54, 54 extend along substantially the entire length of the upper plate member 5 in the length direction (the length direction of the cell group 3).

As illustrated in FIG. 5, the cell side protrusion portion 54 has substantially triangular cross section in which a vertex 54a protrudes in the width direction (Y direction). A surface disposed above the vertex 54a in the cell side protrusion portion 54 has a receiving surface 54b that contacts an insertion member 8 (described later) and receives a load (pressing force) from the insertion member 8. As illustrated in FIG. 5, the receiving surface 54b is slightly recess-curved, and faces above the cell group 3 and outward in the width direction.

The lower plate member 6 is formed of, for example, an insulating resin such as polypropylene or polyethylene. The lower plate member 6 integrally includes a pair of side frame portions 61, 61 extending in parallel with each other at both side portions along the length direction of the lower surface (a surface including bottom surfaces 31d of the battery cells 31) of the cell group 3, and a plurality of lower partition plate portions 62 and support plate portions 63 that connect the pair of side frame portions 61, 61 to each other along the width direction of the cell group 3.

The lower partition plate portions 62 partition the inside of the lower plate member 6 (between the pair of side frame portions 61, 61) along the width direction of the cell group 3. The lower partition plate portions 62 are disposed so that the surface direction thereof is in parallel with the height direction of the cell group 3. The lower partition plate portions 62 are disposed at a predetermined interval in parallel with one another, to correspond to the end surfaces 31b, 31b facing in the stacking direction of the two battery cells 31, 31 disposed at the outermost ends of the cell group 3 and portions between the battery cells 31, 31 adjacent to one another, respectively.

Each of the support plate portions 63 is disposed between the lower partition plate portions 62, 62 adjacent to each other. The support plate portions 63 are disposed so that the surface direction thereof is in parallel with the bottom surface 31d (second surface) of the battery cell 31 in the cell group 3, and are provided in one-to-one correspondence with the respective battery cells 31 in the cell group 3. The support plate portions 63 contact the respective bottom surfaces 31d of the battery cells 31, thereby supporting the respective battery cells 31 from below.

Elastic members 64, 64 made of rubber or the like are attached to the outside of the side frame portions 61, 61, respectively, to extend along the entire length of the side frame portions 61, 61. The elastic member 64 is held between upper claw portions 61a and lower claw portions 61b that are alternately disposed on the upper side and the lower side of the side frame portion 61 in the length direction. The elastic member 64 protrudes toward the outside of the corresponding side frame portion 61, specifically, toward the outside of the lower plate member 6 in the width direction and obliquely downward.

The upper claw portions 61a are provided in one-to-one correspondence with the respective side surfaces 31c of the battery cells 31 configuring the cell group 3. As illustrated in FIG. 7, each of the upper claw portions 61a rises upward from the side frame portion 61 corresponding to the end portion of the support plate portion 63 along the side surface 31c of the battery cell 31. The upper claw portion 61a is provided to be easily elastically deformable in such a direction to approach the side surface 31c of the battery cell 31. Therefore, the back surface of the upper claw portion 61a facing the side surface 31c of the battery cell 31 serves as a contact portion 61c that contacts the side surface 31c of the battery cell 31 to be mounted on the support plate portion 63 when the upper claw portion 61a is elastically deformed.

The upper side of the cell group 3 is covered with the upper plate member 5. In addition, the lower side of the cell group 3 is covered with and supported by the lower plate member when the battery cells 31 are mounted on the respective support plate portions 63. The upper partition plate portions 52 of the upper plate member 5 and the lower partition plate portions 62 of the lower plate member 6 each are held between the battery cells 31, 31 adjacent to each other, which insulates between the battery cells 31, 31. The terminals 32 of each of the battery cells 31 are exposed from the opening 53a in the upper plate member 5, and are connected to the respective bus bars 33. The flexible printed circuit board 34 is disposed on the upper surface of the upper plate member 5. Furthermore, as illustrated in FIG. 3, the upper side of the cell group 3 is covered with a cover member 7 from above the upper plate member 5.

The cell group 3 is inserted into each of the housing spaces 20, 20 in the housing part 2 from each of the openings 20a, 20a in the stacking direction of the battery cells 31, together with the upper plate member 5, the lower plate member 6, and the cover member 7, thereby being housed in the housing part 2. As illustrated in FIG. 2, the cell side protrusion portions 54 of the upper plate member 5 protrude toward an inner surface 23a of the side wall portion 23 and an inner surface 24a of the middle wall portion 24, respectively. In each of the housing spaces 20, 20, the elastic members 64 of the lower plate member 6 contact a corner portion 20b between the lower wall portion 22 and the side wall portion 23 and a corner portion 20c between the lower wall portion 22 and the middle wall portion 24, respectively. Note that portions that the elastic members 64 contact are not limited to the corner portions 20b, 20c, and may be portions closer to the lower wall portion 22 or portions closer to the side wall portion 23 and the middle wall portion 24. That is, it is only required that the elastic members 64 contact the inner surface of the housing space 20 from the lower wall portion 22 to the side wall portion 23 and the middle wall portion 24 via the corner portions 20b, 20c.

As illustrated in FIG. 2, each of the cell groups 3, 3 housed in the housing part 2 is sandwiched between the side wall portion 23 and the middle wall portion 24 via respective heat transfer sheets 35. Therefore, even when two rows of cell groups 3, 3 are housed in one housing part 2, heat can be efficiently exchanged with the heat exchange media flowing through the heat exchange medium flow paths 25, 26 at both sides of each of the battery cells 31 in the width direction. The cell groups 3, 3 housed in the housing part 2 may be integrated by a restraining band or the like (not illustrated) in order to maintain the state in which the battery cells 31 are stacked. One housing part 2 illustrated in the present embodiment includes two rows of housing spaces 20, 20 via the middle wall portion 24, and houses the two cell groups 3, 3 in parallel. However, it is only required that one housing part 2 includes at least one housing space 20.

The end plates 4, 4 are disposed so that each covers the two openings 20a, 20a at each end of the housing part 2, and are fixed to both end surfaces of the housing part 2, respectively, using a plurality of bolts 41 passing through each of the end plates 4, 4.

Figure 8:
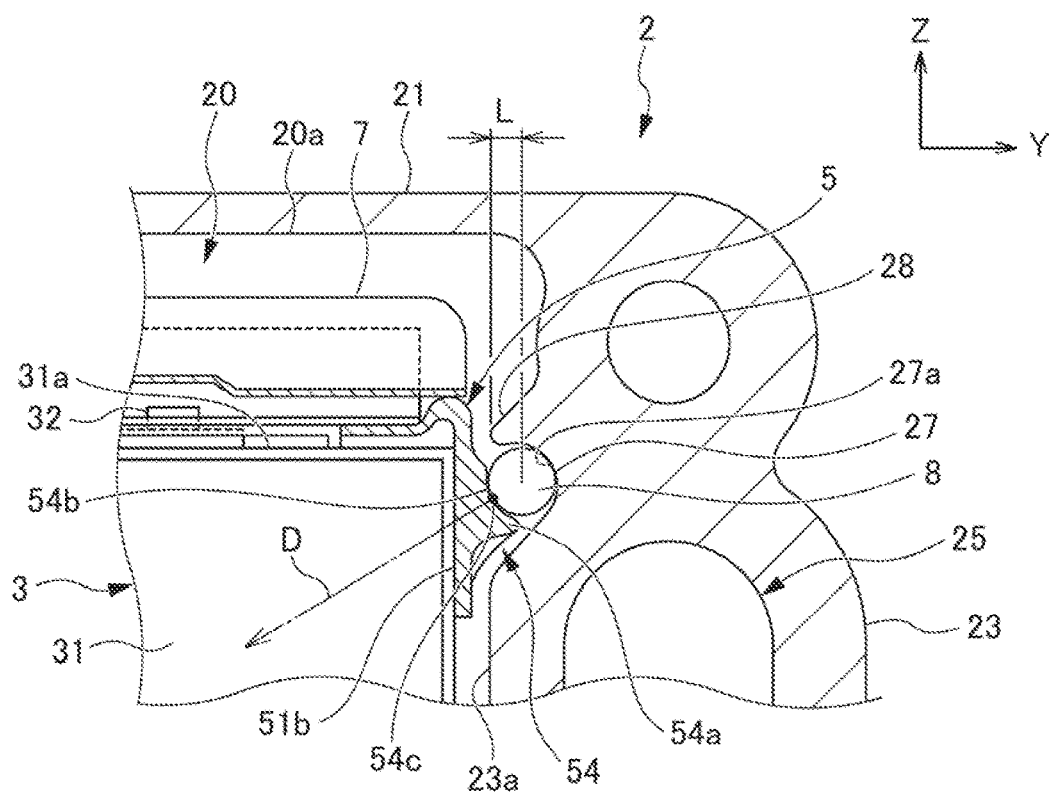
FIG. 8 is an enlarged cross-sectional view illustrating a portion of an insertion member in one cell group in a housing part.
Figure 9:
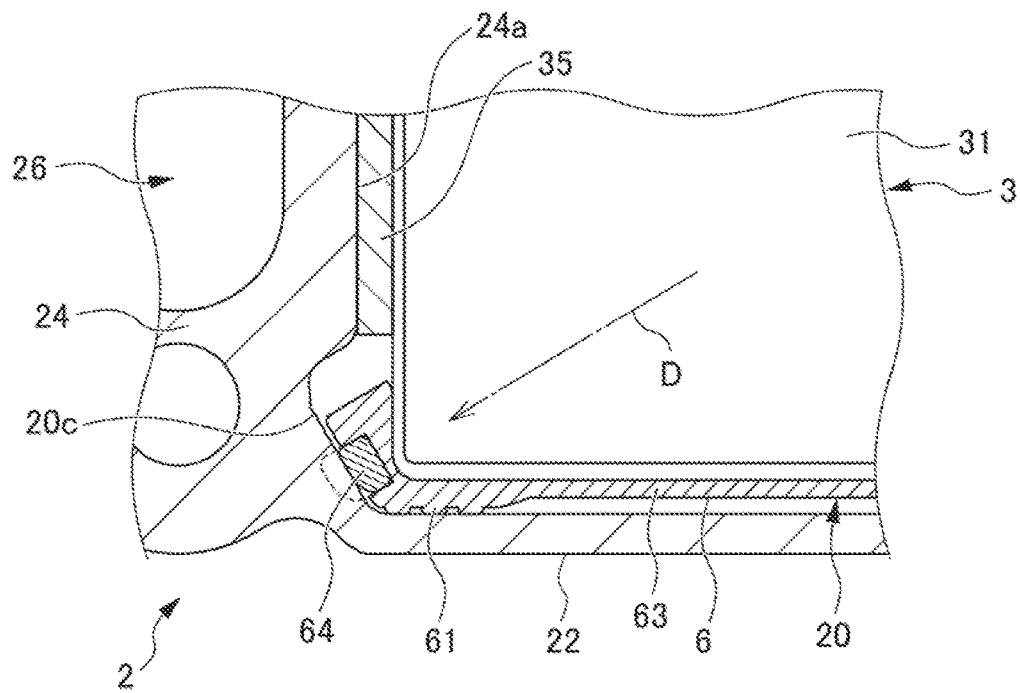
FIG. 9 is an enlarged cross-sectional view illustrating a portion of an elastic member in one cell group in the housing part.
Figure 10:
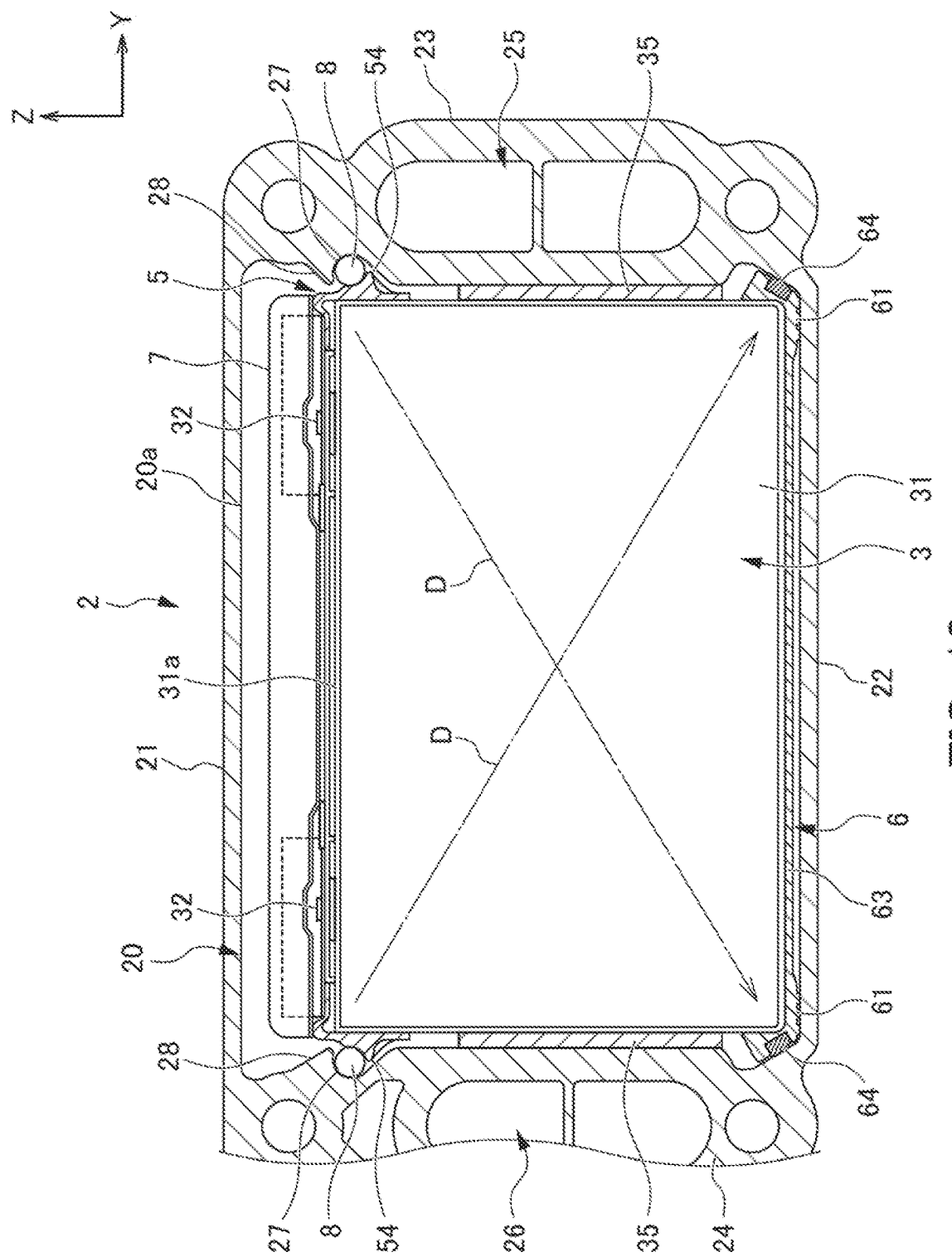
FIG. 10 is a cross-sectional view illustrating a state in which one cell group is fixed in the housing part.
Figure 11:
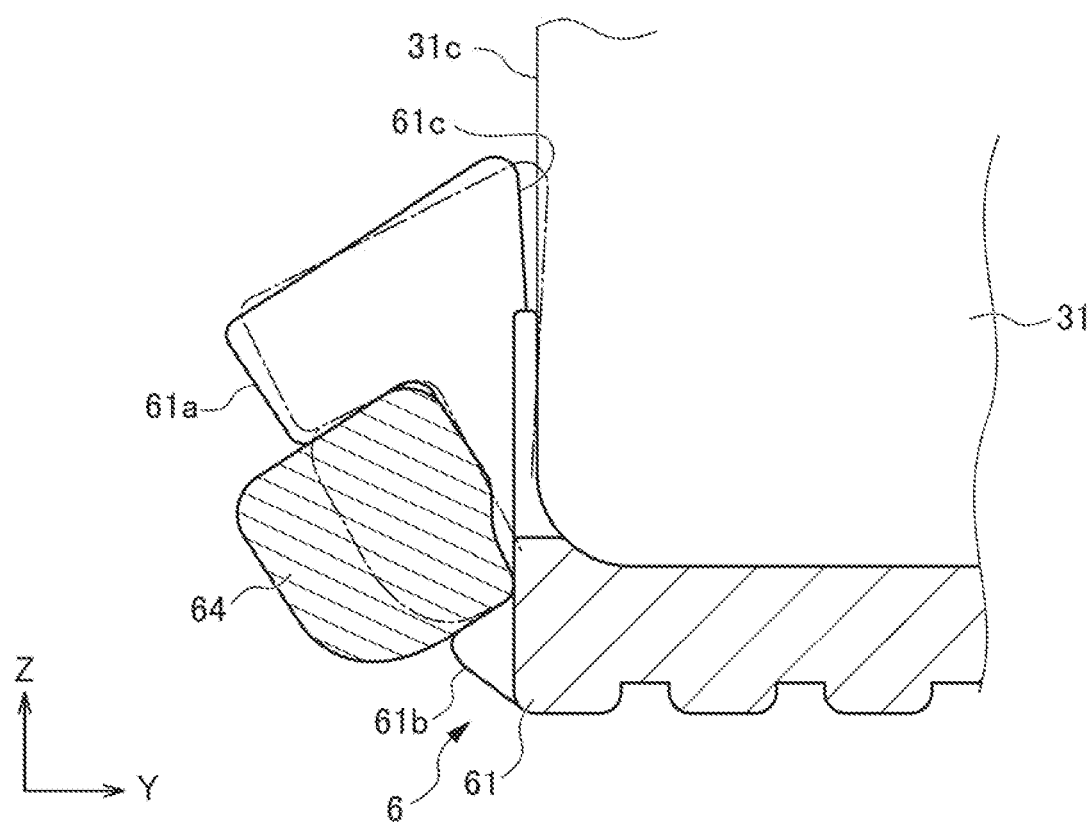
FIG. 11 is a diagram illustrating a state in which a lower portion of a battery cell is fixed by an upper claw portion of the lower plate member.

Next, a configuration for fixing the cell groups 3, 3 housed inside of the housing part 2 will be further described with reference to FIG. 8 to FIG. 11. FIG. 8 is an enlarged cross-sectional view illustrating a portion of the insertion member in one cell group in the housing part. FIG. 9 is an enlarged cross-sectional view illustrating a portion of the elastic member in one cell group in the housing part. FIG. 10 is a cross-sectional view illustrating a state in which one cell group is fixed in the housing part. FIG. 11 is a diagram illustrating a state in which a lower portion of the battery cell is fixed by the upper claw portion of the lower plate member. As illustrated in FIG. 1 and FIG. 8, each of the cell groups 3, 3 housed inside of the housing part 2 is fixed by two insertion members 8, 8.

The insertion member 8 is formed of, for example, metal such as stainless steel, and is a cylindrical bar-shaped body having a length extending the entire length of the housing part 2 and the cell group 3 in the length direction. The insertion members 8 are press-fitted from the opening 20a of the housing part 2, to contact the respective cell side protrusion portions 54 of the upper plate member 5, and respective inner wall surfaces of the housing space 20 disposed closer to the upper surface 31a side of the battery cells 31 than the cell side protrusion portions 54, specifically, the inner surface 23a of the side wall portion 23 and the inner surface 24a of the middle wall portion 24, respectively. Note that FIG. 8 illustrates an arrangement structure of the insertion member 3 between the cell side protrusion portion 54 and the side wall portion 23, but the insertion member 8 between the cell side protrusion portion 54 and the middle wall portion 24 also has the same structure and appears symmetrically to FIG. 8. In addition, FIG. 9 illustrates an arrangement structure of the elastic member 64 between the lower plate member 6 and the middle wall portion 24, but the elastic member 64 between the lower plate member 6 and the side wall portion 23 also has the same structure and appears symmetrically to FIG. 9.

As illustrated in FIG. 8, the insertion member 8 contacts the receiving surface 54b disposed on the upper side in the cell side protrusion portion 54 of the upper plate member 5 and contacts the inner surface 23a of the side wall portions 23 made of metal (or the inner surface 24a of the middle wall portion 24), thereby pressing the cell group 3 against the opposite side of a side facing the upper surface 31a of the battery cell 31, via the cell side protrusion portion 54. Specifically, the insertion member 8 contacts the inner surface 23a of the side wall portion 23 (or the inner surface 24a of the middle wall portion 24), thereby applying a pressing force in a diagonal direction D of the battery cell 31 indicated by a dashed-dotted line in FIG. 8 and FIG. 9 with respect to a contact point 54c with the receiving surface 54b, to press the cell group 3 in the diagonal direction D via the upper plate member 5.

As illustrated in FIG. 9, a load of the cell group 3 pressed by the insertion member 8 in the diagonal direction D is applied to the elastic member 64 of the lower plate member 6 disposed at a diagonal position of the cell side protrusion portion 54. The elastic member 64 is compressed upon receipt of the load from the cell group 3, and applies a reaction force to the cell group 3, thereby stably holding the cell group 3. That is, in the power storage device 1, the cell group 3 can be pressed and held in the housing part 2 just by press-fitting the insertion members 8, 8 between the respective cell side protrusion portions 54 of the upper plate member 5 housed in the housing part 2 together with the cell group 3 and the respective inner wall surfaces of the housing part 2 (the inner surface 23a of the side wall portion 23 and the inner surface 24a of the middle wall portion 24). Therefore, the power storage device 1 can be provided in which the plurality of battery cells 31 can be easily held in the housing part 2, resulting in good assembly workability.

Since the cell group 3 is held when the elastic member 64 is compressed, the vibration applied to the cell group 3 can be absorbed by the elastic member 64, whereby noise and impacts caused by such vibration can be prevented from occurring. Moreover, since the elastic members 64 are disposed in the corner portions 20b, 20c at the diagonal positions of the insertion members 8, 8 via the cell group 3, respectively, the vibrations in the up-down direction and the left-right direction of the cell group 3 can be absorbed just by disposing the elastic members 64, 64 at portions of the cell group 3 in the width direction, respectively. Since the elastic members 64 are provided in the lower plate member 6, the elastic members 64 can be easily disposed in the housing part 2 by housing the lower plate member 6 in the housing space 20 of the housing part 2 together with the cell group 3.

The cell side protrusion portions 54, 54 of the present embodiment are disposed in the upper plate member 5 on respective sides of both side surfaces 31c, 31c of the battery cell 31, and are pressed by the respective insertion members 8, 8. Therefore, as illustrated in FIG. 10, the pressing forces applied by the respective insertion members 8, 8 are applied to the cell group 3 in the two diagonal directions D, D. Thus, the cell group 3 can be more stably held in the housing space 20 of the housing part 2.

As indicated by a dashed-dotted line in FIG. 11, when the elastic member 64 is compressed, the elastic member 64 presses the upper claw portion 61a of the lower plate member 6 toward the side surface 31c of the battery cell 31 by the reaction force. Thus, the upper claw portion 61a is elastically deformed toward the side surface 31c of the battery cell 31, and the contact portion 61c on the back surface side of the upper claw portion 61a contacts the side surface 31c of the battery cell 31. Since the upper claw portions 61a are disposed on the pair of side frame portions 61, 61, respectively, to sandwich the battery cell 31 from both sides, the pair of upper claw portions 61a, 61a sandwich the side surfaces 31c of the battery cell 31 from both sides when being elastically deformed, whereby the lower portion of the battery cell 31 is firmly held.

As illustrated in FIG. 2, FIG. 8, and FIG. 10, a contact recess portion 27 having an inner surface 27a sandwiching the insertion member 8 between the contact recess portion 27 and the cell side protrusion portion 54 is provided in the inner wall surface of the housing part 2 disposed closer to the upper surface 31a side of the battery cell 31 than the cell side protrusion portion 54, that is, the inner surface 23a of the side wall portion 23 (or the inner surface 24a of the middle wall portion 24). The contact recess portion 27 is formed in the inner surface 23a of the side wall portion 23 (or the inner surface 24a of the middle wall portion 24) closer to the upper wall portion 21 of the housing part 2 than the cell side protrusion portion 54, to face the receiving surface 54b of the cell side protrusion portion 54 along the entire length of the housing part 2 in the length direction. Accordingly, the inner surface 27a of the contact recess portion 27 faces the receiving surface 54b of the cell side protrusion portion 54 via the insertion member 8.

The insertion member 8 is press-fitted along the contact recess portion 27 while contacting the receiving surface 54b of the cell side protrusion portion 54 and being housed in the contact recess portion 27. Therefore, the insertion member 8 is smoothly guided in the insertion direction by the contact recess portion 27. Since the insertion member 8 press-fitted to be fitted into the contact recess portion 27 is held in the contact recess portion 27, the pressing force can be stably applied to the receiving surface 54b of the cell side protrusion portion 54. In addition, since it is simply required that the insertion member 8 is made small to an extent capable of being fitted into the contact recess portion 27, the power storage device 1 can be reduced in size and weight.

As illustrated in FIG. 8, an inner wall side protrusion portion 28 protruding toward the cell group 3 side is provided in the inner wall surface of the housing part 2 facing the cell side protrusion portion 54, that is, the inner surface 23a of the side wall portion 23 (or the inner surface 24a of the middle wall portion 24). The inner wall side protrusion portion 28 is smoothly continued from the inner surface 27a of the contact recess portion 27, and protrudes toward the cell group 3 along the entire length of the housing part 2 in the length direction to cover above the cell side protrusion portion 54 (or the upper wall portion 21 side of the housing part 2) via the insertion member 8.

The inner wall side protrusion portion 28 is disposed on the opposite side of the cell side protrusion portion 54 via the insertion member 8, and at least a part of the inner wall side protrusion portion 28 overlaps with the cell side protrusion portion 54 as viewed from the side facing the upper surface 31a of the battery cell 31. That is, as illustrated in FIG. 8, the inner wall side protrusion portion 28 protrudes toward the cell group 3, and therefore overlaps with the cell side protrusion portion 54 at a distance L. Therefore, the insertion member 8 is prevented from coming off upward from the contact recess portion 27. Furthermore, since the movement of the cell group 3 in a direction in which the cell side protrusion portion 54 and the inner wall side protrusion portion 28 approach each other (movement of the cell group 3 toward the upper wall portion 21) is restricted by contact between the cell side protrusion portion 54 and the inner wall side protrusion portion 28, the terminals 32 of the battery cell 31 can be prevented from contacting the upper wall portion 21 and the like, whereby the terminals 32 can be protected.

EXPLANATION OF REFERENCE NUMERALS

1 Power storage device
2 Housing part
23a Inner surface (of side wall portion) (inner wall surface of housing part)
24a Inner surface (of middle wall portion) (inner wall surface of housing part)
27 Contact recess portion
27a Inner surface (of contact recess portion)
28 Inner wall side protrusion portion
3 Cell group
31 Battery cell
31a Upper surface (first surface) (of battery cell)
31c Side surface (of battery cell)
31d Bottom surface (second surface) (of battery cell)

32 Terminal
5 Upper plate member (first plate member)
54 Cell side protrusion portion
6 Lower plate member (second plate member)
61 Side frame portion
61a Upper claw portion
61c Contact portion
64 Elastic member
8 Insertion member

What is claimed is:

1. A power storage device comprising:
a cell group in which a plurality of battery cells each having a terminal on a first surface are stacked;
a cylindrical housing part that houses the cell group and includes an upper wall portion, a lower wall portion, and two side wall portions that respectively cover the first surface, a surface opposite to the first surface, and a side surface adjacent to the first surface of a respective one of the battery cells in the cell group;
a first plate member extending from the first surface of each of the battery cells in the cell group to side surfaces of each of the battery cells, the side surfaces being adjacent to the first surface, the first plate member being housed in the housing part together with the cell group;
a cell side protrusion portion protruding from a portion extending on each of the side surfaces of each of the battery cells toward an inner wall surface of the housing part in the first plate member;
an insertion member that has a bar-shaped body having a length extending an entire length of the cell group in a length direction, and is press-fitted from an opening that is open at an end of the housing part to contact both of the cell side protrusion portion and the inner wall surface disposed closer to the first surface side than the cell side protrusion portion;
wherein the cell side protrusion portion has a receiving surface arranged to face the upper wall portion side and the outward in the width direction of the cell group and receives a pressing force from the insertion member; and
wherein the insertion member presses the cell group in a diagonal direction of the battery cells against a contact point with the receiving surface via the receiving surface of the cell side protrusion portion.

2. The power storage device according to claim 1, wherein an elastic member that receives a load from the cell group pressed by the insertion member is provided between the cell group and the inner wall surface of the housing part.

3. The power storage device according to claim 2, wherein the elastic member is disposed in a corner portion at a diagonal position of the insertion member via the cell group.

4. The power storage device according to claim 2 comprising:
a second plate member disposed to cover a second surface side of each of the battery cells disposed at an opposite side of the first surface in the cell group, the second plate member being housed in the housing part together with the cell group,
wherein the elastic member is provided in the second plate member.

5. The power storage device according to claim 4, wherein the second plate member includes a pair of side frame portions extending at both ends along a length direction of a lower surface of the cell group,
the elastic member is held between upper claw portions and lower claw portions that are alternately disposed on an upper side and a lower side of each of the pair of side frame portions along the length direction, and
each of the upper claw portions includes a contact portion that contacts the side surface of the battery cell.

6. The power storage device according to claim 1, wherein the cell side protrusion portion is disposed in the first plate member on each of both side surface sides of the battery cell.

7. The power storage device according to claim 1, wherein a contact recess portion having an inner surface sandwiching the insertion member between the contact recess portion and the cell side protrusion portion is provided in the inner wall surface of the housing part disposed closer to the first surface side than the cell side protrusion portion.

8. The power storage device according to claim 7, wherein an inner wall side protrusion portion protruding toward the cell group side is provided in the inner wall surface of the housing part facing the cell side protrusion portion, and
the inner wall side protrusion portion is disposed on an opposite side of the cell side protrusion portion via the insertion member, and at least a part of the inner wall side protrusion portion overlaps with the cell side protrusion portion as viewed from a side facing the first surface.

9. A power storage device comprising:
a cell group in which a plurality of battery cells each having a terminal on a first surface are stacked;
a cylindrical housing part that houses the cell group and includes an upper wall portion, a lower wall portion, and two side wall portions;
a first plate member extending from the first surface of each of the battery cells in the cell group to side surfaces of each of the battery cells, the side surfaces being adjacent to the first surface, the first plate member being housed in the housing part together with the cell group;
a cell side protrusion portion protruding from a portion extending on each of the side surfaces of each of the battery cells toward an inner wall surface of the housing part in the first plate member; and
an insertion member that has a bar-shaped body having a length extending an entire length of the cell group in a length direction, and is press-fitted from an opening that is open at an end of the housing part to contact both of the cell side protrusion portion and the inner wall surface disposed closer to the first surface side than the cell side protrusion portion, and to press the cell group against an opposite side of a side facing the first surface via the cell side protrusion portion,
wherein an elastic member that receives a load from the cell group pressed by the insertion member is provided between the cell group and the inner wall surface of the housing part,
the power storage device further comprising:
a second plate member disposed to cover a second surface side of each of the battery cells disposed at an opposite side of the first surface in the cell group, the second plate member being housed in the housing part together with the cell group,
wherein the elastic member is provided in the second plate member,
wherein the second plate member includes a pair of side frame portions extending at both ends along a length direction of a lower surface of the cell group,
the elastic member is held between upper claw portions and lower claw portions that are alternately disposed on an upper side and a lower side of each of the pair of side frame portions along the length direction, and each of the upper claw portions includes a contact portion that contacts the side surface of a respective one of the battery cells.

10. A power storage device comprising:
a cell group in which a plurality of battery cells each having a terminal on a first surface are stacked;
a cylindrical housing part that houses the cell group and includes an upper wall portion, a lower wall portion, and two side wall portions;
a first plate member extending from the first surface of each of the battery cells in the cell group to side surfaces of each of the battery cells, the side surfaces being adjacent to the first surface, the first plate member being housed in the housing part together with the cell group;
a cell side protrusion portion protruding from a portion extending on each of the side surfaces of each of the battery cells toward an inner wall surface of the housing part in the first plate member; and
an insertion member that has a bar-shaped body having a length extending an entire length of the cell group in a length direction, and is press-fitted from an opening that is open at an end of the housing part to contact both of the cell side protrusion portion and the inner wall surface disposed closer to the first surface side than the cell side protrusion portion, and to press the cell group against an opposite side of a side facing the first surface via the cell side protrusion portion,
wherein the cell side protrusion portion has a receiving surface arranged to face the upper wall portion side and the outward in the width direction of the cell group and receives a pressing force from the insertion member; and
a contact recess portion having an inner surface sandwiching the insertion member between the contact recess portion and the receiving surface is provided in the inner wall surface of the housing part disposed closer to the first surface side than the cell side protrusion portion, to face the receiving surface.

* * * * *